United States Patent
Hawkins et al.

(10) Patent No.: US 6,830,793 B2
(45) Date of Patent: Dec. 14, 2004

(54) COMPOSITE DAMPING MATERIAL

(75) Inventors: Gary F Hawkins, Torrance, CA (US); John W. Murdock, Palos Verdes Estates, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 10/103,333

(22) Filed: Mar. 20, 2002

(65) Prior Publication Data

US 2002/0172783 A1 Nov. 21, 2002

Related U.S. Application Data (63) Continuation-in-part of application No. 09/407,039, filed on Sep. 27, 1999, now Pat. No. 6,447,871.

(51) Int. Cl.⁷ .............................. B32B 1/08; B32B 3/30; B32B 3/12; A43B 13/18; F16F 9/00

(52) U.S. Cl. .................... 428/36.9; 428/166; 428/178; 248/562; 248/636; 5/655.5; 5/654; 36/28; 36/29; 267/113; 160/185; 160/186; 160/187; 160/188

(58) Field of Search .................... 428/36.9, 166, 428/178; 248/562, 636; 5/655.5, 654; 36/28, 29; 267/113; 160/185–188

(56) References Cited

U.S. PATENT DOCUMENTS

| | | | |
|---|---|---|---|
| 4,624,880 A | | 11/1986 | Goulding et al. |
| 4,707,872 A | * | 11/1987 | Hessel ............................ 5/676 |
| 4,923,057 A | | 5/1990 | Carlson et al. |
| 4,948,442 A | * | 8/1990 | Manns ...................... 156/73.1 |
| 5,019,439 A | | 5/1991 | Momose |
| 5,044,030 A | * | 9/1991 | Balaton ......................... 5/710 |
| 5,128,200 A | | 7/1992 | Colley et al. |
| 5,138,776 A | | 8/1992 | Levin |
| 5,217,787 A | | 6/1993 | Monahan |
| 5,254,387 A | | 10/1993 | Gallucci |
| 5,256,223 A | | 10/1993 | Alberts et al. |
| 5,395,674 A | * | 3/1995 | Schmidt et al. ............. 428/178 |
| 5,400,296 A | | 3/1995 | Cushman et al. |
| 5,444,926 A | * | 8/1995 | Allen et al. ..................... 36/93 |
| 5,472,761 A | | 12/1995 | Goldberg et al. |
| 5,573,824 A | | 11/1996 | Klocek et al. |
| 5,667,895 A | * | 9/1997 | Jenkner ................... 428/424.4 |
| 5,679,439 A | * | 10/1997 | Schmidt et al. ............. 428/178 |
| 5,753,061 A | * | 5/1998 | Rudy .......................... 156/147 |
| 5,826,350 A | | 10/1998 | Wallerstein |
| 5,848,782 A | | 12/1998 | Hein et al. |
| 5,916,664 A | * | 6/1999 | Rudy .......................... 428/178 |
| 5,965,249 A | | 10/1999 | Sutton et al. |
| 6,048,426 A | | 4/2000 | Pratt |
| 6,447,871 B1 | * | 9/2002 | Hawkins ...................... 428/67 |

\* cited by examiner

*Primary Examiner*—Harold Pyon
*Assistant Examiner*—Chris Bruenjes
(74) *Attorney, Agent, or Firm*—Henricks, Slavin & Holmes LLP (57) ABSTRACT

A composite material is provided that includes an array of machine elements disposed within a matrix material. Each machine element includes a cross-section defining an internal space that is filled with a viscous fluid. Preferably, the machine elements are provided in complementary pairs of tubular members, with the internal spaces of the tubular members communicating with one another. When subjected to a predetermined force, the cross-sections of the tubular members change shape, changing the volume of the internal spaces, and causing fluid to flow into or out of the internal spaces. Preferably, under the predetermined force, one tubular member increases in volume and the other tubular member simultaneously decreases in volume, thereby causing fluid to flow between the tubular elements to dissipate energy from the predetermined force.

26 Claims, 4 Drawing Sheets

COMPOSITE DAMPING MATERIAL

This application is a Continuation-in-Part of U.S. application Ser. No. 09/407,039, filed Sep. 27, 1999, now U.S. Pat. No. 6,447,871 the disclosure of which is expressly incorporated herein by reference.

FIELD OF INVENTION

The present invention relates generally to composite materials, and more particularly to composite materials including machines embedded in polymeric matrix materials, and even more particularly to fluid-filled bodies embedded in polymeric matrix materials that act as damping materials.

BACKGROUND

Many composite materials have been suggested as an alternative to traditional materials, such as metal or wood. Generally, such materials include fabric or strands of fiber, such as kevlar, carbon or glass, that are impregnated within a binding matrix, such as an epoxy resin. The strands are arranged within the matrix in a predetermined orientation to provide desired physical properties for the material. For example, composite materials are often designed to provide increased rigidity and strength at substantially less weight as compared to traditional materials.

Composite honeycomb materials have also been suggested that include a honeycomb core sandwiched between two skins. The honeycomb material may be formed from plastic, metal, or fiber reinforced plastic, which may also provide enhanced structural properties at substantially less weight as compared to traditional materials. Foam-core structures formed from a variety of plastics or fiber reinforced plastics have also been suggested that may have similar properties to honeycomb materials.

One application for composite materials is as fairings used to secure payloads within launch vehicles or spacecraft. Such vehicles experience substantial vibroacoustic forces during launch, for example, generated by engine exhaust flow or by aerodynamic forces on the vehicle skin. The skin reaction to these forces takes the form of vibrations that are transmitted to items mounted on the skin and may be carried by structural connections to other locations within the vehicle. These forces may cause fatigue or other failures of components within the vehicle, such as electrical units or wiring, which may be mounted to the skin.

Additionally, the skin vibration may be re-radiated into the interior spaces of a vehicle as acoustic energy. This re-radiation may be particularly significant to the payload fairings. The acoustic levels experienced by such fairings have been critical design considerations for controlling vibrational effects on payloads mounted on these fairing surfaces. Traditional techniques for mitigating these effects include surface treatments, blankets, acoustic absorbers, such as resonators, and active noise control schemes.

The radiation of energy through a structure is inversely proportional to its material stiffness and damping losses. Composite materials have been incorporated into fairing designs, because of their high structural stiffness and low overall weight. These designs, however, generally have poor sound blocking qualities and, consequently, blankets or Helmholtz absorbers are often used to provide additional damping, which may negate any weight savings and increase fabrication complexity.

Damping materials have been suggested that include porous materials within which viscous fluids are entrapped, such as that disclosed in U.S. Pat. No. 5,965,249. Viscoelastic materials may be mixed with matrix material at high temperature, and the matrix material subsequently hardened, thereby trapping the viscoelastic materials within pores of the matrix. Thus, this material is similar to a sponge, having random pores therein that are filled with fluid. Such a material, however, may not exhibit substantially uniform physical properties, and may not be designed to respond in a predetermined manner to particular types of forces that may be experienced during use.

Accordingly, composite materials that damp forces, such as vibroacoustic forces, would be considered useful.

SUMMARY OF THE INVENTION

The present invention is directed to composite materials, and more particularly to fluid-filled three dimensional bodies or "machines" that are embedded in polymeric matrix materials that may act as damping materials.

In accordance with one aspect of the present invention, a composite material is provided that includes a matrix material and a first body disposed within the matrix material. The first body includes a first internal space configured to change volume when the composite material is subjected to a predetermined force. A fluid is provided within the first internal space, whereby fluid may flow within, into, and/or out of the first internal space when the predetermined force changes the volume of the internal space.

Preferably, the fluid is a viscous fluid having a predetermined viscosity for dissipating energy when the predetermined force changes the volume of the first internal space. More preferably, the fluid is substantially incompressible.

In one embodiment, a reservoir is provided for receiving fluid from or adding fluid into the first internal space in response to the predetermined force. Alternatively, a second body may be disposed within the matrix material, the second body comprising a second internal space configured to change volume when the composite material is subjected to a predetermined force, the second internal space communicating with the first internal space. Preferably, the first internal space is configured to increase in volume and the second internal space is configured to decrease in volume in response to the predetermined force, thereby providing a substantially closed system.

In a further alternative, the fluid within the internal space may include one or more bubbles of compressible fluid with the remainder of the internal space being filled with an incompressible fluid. For example, a compressible bubble may be provided that extends across the cross-section of the internal space, e.g., due to surface tension, thereby dividing the internal space into two regions of incompressible fluid separated by a compressible "reservoir." The bubble may act as a reservoir, because it may expand or contract as the volume of the internal space changes when the body changes shape to accommodate the incompressible fluid. Alternatively, a plurality of bubbles may be suspended or otherwise dissolved within the incompressible fluid that may act as reservoirs in a similar manner.

In one embodiment, the body is an elongate tubular member defining a longitudinal axis and a cross-section. The cross-section is configured to change shape in response to the predetermined force, thereby changing the volume of the internal space. A fluid within the internal space has a predetermined viscosity, whereby, as the volume of the internal space changes in response to the predetermined force, the fluid moves within the internal space, thereby damping the predetermined force.

More preferably, an array of elongate tubular members is arranged in a predetermined configuration within the matrix material, for example, in a plane. Each tubular member preferably includes a pair of opposing planar portions arranged substantially parallel to the plane. The opposing planar portions may move relative to one another within the matrix material to change the volume of the internal space. Each tubular member also includes a pair of connecting portions extending between the opposing planar portions, the connecting portions limiting relative movement of the opposing planar portions within the matrix material in a predetermined manner.

In one embodiment, the connecting portions may be transverse portions extending between the opposing planar portions, thereby defining a generally "z" shaped cross-section. In another embodiment, the connecting portions may be curved portions extending between the opposing planar portions, thereby defining at least one of an hourglass cross-section and an apple cross-section.

In another embodiment, the tubular members may be generally cylindrical members arranged substantially parallel to the longitudinal axis. Preferably, some of the cylindrical members maintain substantially constant cross-sections when subjected to a tensile force directed substantially parallel to the longitudinal axis, while other cylindrical members decrease in cross-section when subjected to the tensile force.

Thus, a composite material in accordance with the present invention may be used for damping energy within a composite material. Preferably, pairs of complementary bodies are disposed within a matrix material, the bodies being filled with a viscous fluid. The composite material may be subjected to a predetermined force, e.g., a vibrational force, such that the bodies change volume, thereby causing the fluid to move into or out of the bodies to dampen displacement of the composite material due to the predetermined force. Preferably, due to the predetermined force, one of the bodies increases in volume while the other body decreases in volume, thereby causing viscous fluid to flow between the bodies to damp energy from the predetermined force. The predetermined force that may be damped may include a shear force directed substantially parallel to the plane, a compressive/tensile force directed substantially transverse to the plane, and/or a compressive/tensile force directed substantially parallel to the plane.

Other objects and features of the present invention will become apparent from consideration of the following description taken in conjunction with the accompanying drawings.

BRIEF DESCRIPTION OF THE DRAWINGS

For a better understanding of the invention, and to show how it may be carried into effect, reference will be made, by way of example, to the accompanying drawings, in which.

DETAILED DESCRIPTION OF THE PREFERRED EMBODIMENTS

Figure 1:
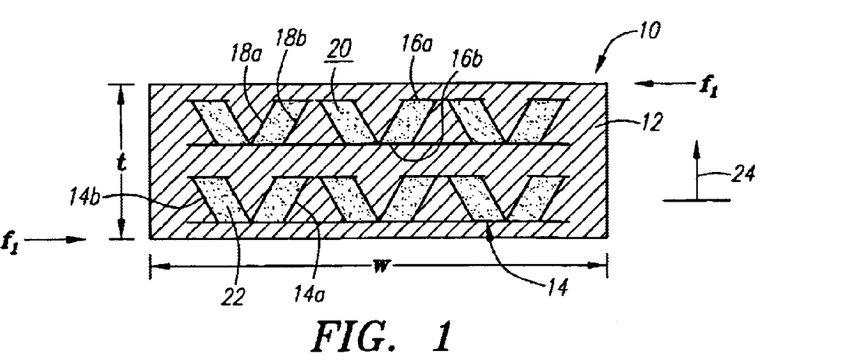
FIG. 1 is a cross-sectional view of a first preferred embodiment of a composite damping material, including a plurality of elongate tubular elements embedded in a matrix material, in accordance with the present invention.

Turning to the drawings, FIG. 1 shows a first preferred embodiment of a composite damping material 10, in accordance with the present invention. Generally, the composite material 10 includes a matrix material 12 and one or more arrays of elongate tubular members 14 (two arrays shown) disposed within the matrix material 12.

The matrix material 12 may be cast around the tubular members 14, and may be formed from any castable material, porous or nonporous, and preferably epoxy, although other polymers and plastics may also be used, such as polyester or vinylester resins. The matrix material 12 is preferably relatively soft and/or has a relatively low modulus compared to the material of the tubular members 14 to facilitate deflection of the tubular members 14 therein and facilitate dissipating stresses in the composite material 10 by the tubular members 14, as explained further below.

Figure 2:
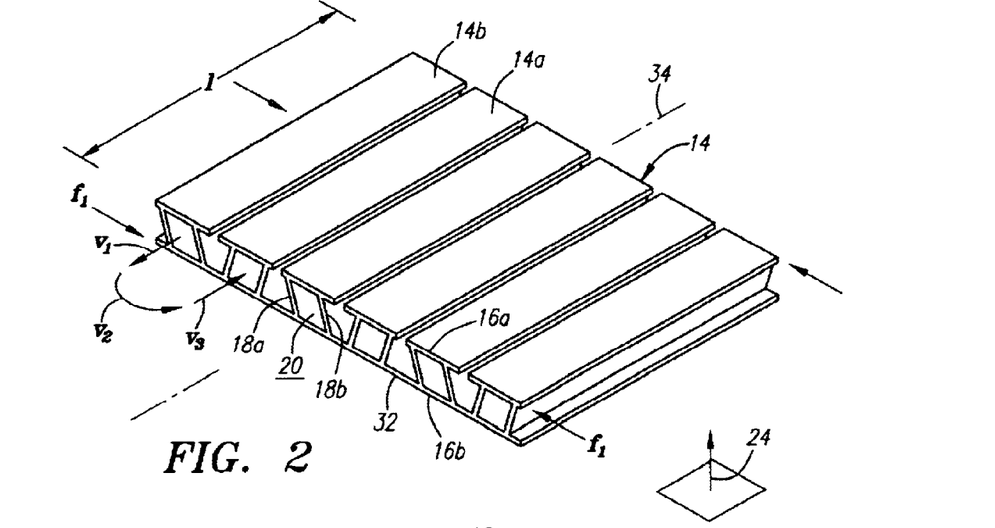
FIG. 2 is a perspective view of a ply of elongate tubular elements that may be incorporated in the composite damping material of FIG. 1.
Figure 3:
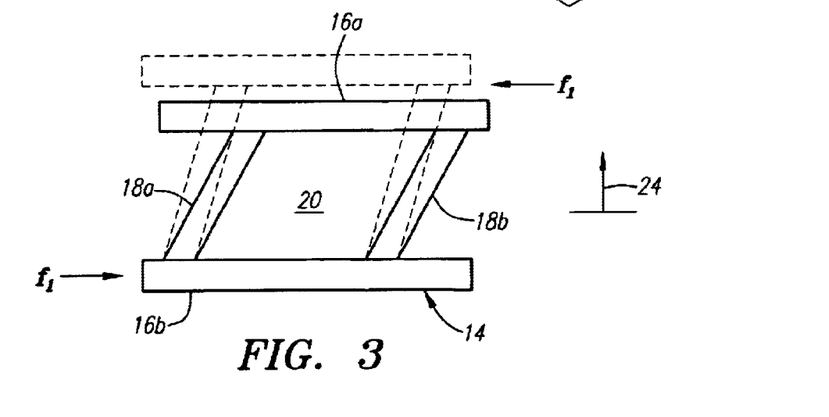
FIG. 3 is a detail of an end view of one of the tubular elements of FIG. 2, showing displacement of the tubular element when acted upon by a shear force in phantom.

Turning to FIGS. 2 and 3, each of the tubular members 14 generally includes one or more side walls 16, 18 defining an internal space 20. The internal space 20 is filled with a fluid 22 (shown in FIG. 1), preferably an incompressible fluid, having a predetermined viscosity, such as a liquid, an oil, a gel, and the like.

The tubular members 14 may be formed from semi-rigid materials using known processes, such as molding, machining, or extruding. In a preferred form, the tubular members 14 are elongate extrusions formed from nylon or polyvinyl chloride ("PVC"), having a length "l" similar to a length of the composite material 10 (not shown). Other materials may also be appropriate for the tubular members 14, such as glass or metals, such as aluminum or steel.

In the preferred embodiment shown in FIG. 3, each tubular member 14 includes opposing pairs of substantially nonporous walls 16, 18 defining the internal space 20. The tubular member 14 includes upper and lower planar walls 16a, 16b that are disposed generally parallel to a plane (normal to arrow 24) within which the tubular member 14 may be arranged with other tubular members to define an array (such as that shown in FIG. 1). The tubular member 14 includes transverse walls 18a, 18b that extend between and connect the planar walls 16a, 16b, thereby defining a generally "Z" shape. The transverse walls 18a, 18b may act as hinges such that the planar walls 16a, 16b may move relative to one another but remain substantially parallel to one another and the plane 24.

As shown in FIG. 3, the tubular member 14 may be subjected to a shear force $f_1$ that may cause the tubular member 14 to change shape. Specifically, in response to the shear force $f_1$, the transverse walls 18 may pivot with respect to the planar walls 16, thereby moving the planar walls 16 away from one another, as shown in phantom. This causes a change in cross-section of the tubular member 14 that changes a volume of the internal space 20.

As the volume of the internal space 20 changes in response to the predetermined force, fluid within the internal space 20 moves along the tubular member 14. For example, under the force $f_1$, the volume of the internal space 20 increases. This decreases pressure within the internal space 20, thereby causing fluid to flow into the tubular member 14 (assuming a substantially incompressible fluid). Conversely, if an opposite force $-f_1$ (not shown) is applied, the volume of the internal space 20 will decrease, thereby increasing pressure, and forcing fluid out of the internal space 20 of the tubular member 14.

To accommodate flow of fluid into and out of the tubular member 14, a reservoir (not shown) may be used that communicates with the internal space 20. For example, a reservoir may be provided on or adjacent to one or both ends of the tubular member 14. The reservoir may be expandable and collapsible to accommodate exchanging fluid with the tubular member 14, or may have a fixed size and shape.

Figure 12A:
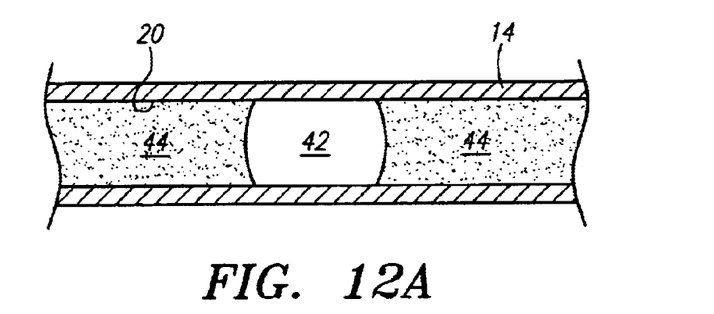
FIGS. 12A and 12B are cross-sectional side views of a tubular member filled with an incompressible fluid including a compressible bubble suspended therein.
Figure 12B:
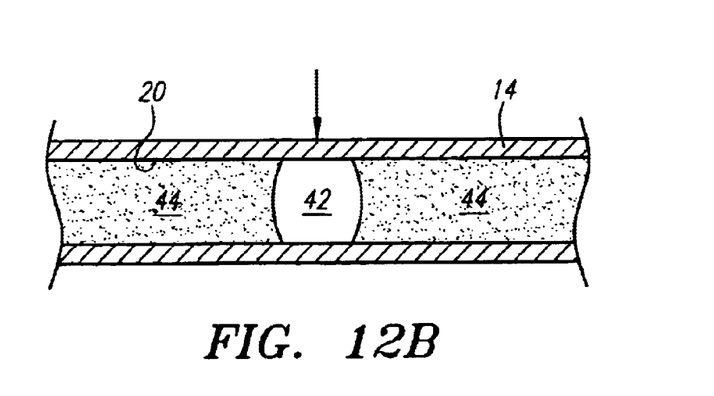

Alternatively, as shown in FIGS. 12A and 12B, the internal space 20 of the tubular member 14 may include a compressible material or bubble 42 separating two regions of incompressible fluid 44. The ends (not shown) of the tubular member 14 may be substantially sealed such that the tubular member 14 may respond substantially independently from other tubular members (not shown). The bubble 42 may be a compressible fluid, such as a substantially inert gas, e.g., air, that may be insoluble in the incompressible fluid 44. The bubble 42 preferably remains substantially stationary within the internal space 20, e.g., due to surface tension or other natural adhesion with the wall(s) of the tubular member 14. Alternatively, a plurality of compressible bubbles (not shown) may be provided across the internal space 20. In a further alternative, a plurality of bubbles (also not shown) may be suspended or otherwise dissolved in the compressible fluid.

The bubble 42 may act as a "reservoir," accommodating movement of the incompressible fluid 44 when the internal space 20 changes volume in response to external forces. For example, FIG. 12A shows the tubular member 14 in a relaxed state, i.e., free of external forces. When an external force reduces the cross-section of the tubular member 14, as shown in FIG. 12B, consequently decreasing the volume of the internal space 20, the bubble 42 may be compressed to accommodate encroachment of the incompressible fluid 44. Similarly, if the cross-section of the tubular member 14 is increased (not shown), the bubble 42 may expand to allow the volume of the internal space 20 to increase.

Returning to FIGS. 1 and 2, to minimize or eliminate the need for individual reservoirs for each tubular member 14, it may be desirable to provide an array of tubular members 14 such that volume increases within some tubular members 14a are offset by corresponding volume decreases in other tubular members 14b. To accomplish this, the tubular members 14 are preferably provided in complementary pairs. For example, each complementary pair may include a tubular member 14a, similar to that shown in FIG. 3, and a tubular member 14b that is its mirror image. Thus, as shown in FIG. 2, when the array is subjected to shear force $f_1$, the tubular members 14a may increase in volume while the mirror image tubular members 14b may decrease in volume.

This causes fluid to flow out of the tubular members 14b and into the tubular members 14a, as shown schematically by arrows $v_1$ and $v_3$, respectively. If the internal spaces 20 within the tubular members 14a, 14b are connected to one another, e.g., by a channel (not shown), the fluid flowing from the first tubular member 14b may flow into the second tubular member 14a, as shown by arrow $v_2$. Thus, each pair of tubular members 14a, 14b may provide a substantially closed system, which may be particularly useful if the fluid is substantially incompressible. Although the volume within each tubular member 14a, 14b may increase or decrease, the total volume of the two tubular members 14a, 14b may remain substantially constant. Thus, a fixed volume of incompressible fluid may be provided within each pair of tubular members 14.

Figures 4, 6:
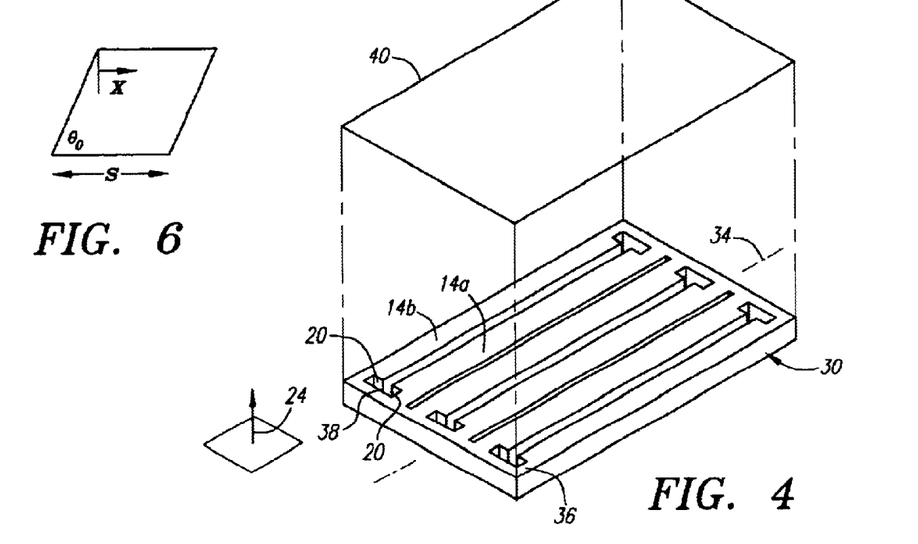
FIG. 4 is a perspective view of a ply of elongate tubular elements disposed in pairs with manifolds including reservoirs communicating between respective pairs of the tubular elements.
FIG. 6 is a cross-sectional detail of one element of the composite material of FIG. 5.

Turning to FIG. 4, a ply 30 is shown that includes a plurality of tubular members 14 arranged in pairs of closed systems. The ply 30 includes complementary pairs of tubular members 14 that are disposed in a predetermined array, for example, in a row arranged along the plane 24 substantially parallel to longitudinal axis 34. The tubular members 14 may be initially individually bonded to a mesh carrier (not shown) to facilitate maintaining the tubular members 14 in the predetermined array within a matrix material (not shown). Appropriate materials for the mesh carrier include spunbonded polyester or a unidirectional ply of a traditional composite material.

Alternatively, as shown in FIG. 2, adjacent tubular members 14 may be connected to one another by a connector 32, e.g., extending substantially parallel to the plane 24. The connectors 32 may be integrally extruded along with the tubular members 14, thereby more precisely setting the spacing of the tubular members 14 within the matrix material 12. In a further alternative, a plurality of individual connectors (not shown) may be attached between adjacent tubular members at desired intervals along the longitudinal axis 34. The connectors 32 may be sufficiently thin and/or flexible to ensure that each tubular member 14 acts substantially independently from one another within the matrix material. Alternatively, the connectors 32 may result in the tubular members 14 being provided in banks that cooperate with one another in a predetermined manner.

Returning to FIG. 4, the ply 30 also may include manifolds 36 that extend substantially perpendicular to the longitudinal axis 34 along respective ends of the tubular members 14. Channels 38 are provided in the manifolds 36 that communicate with the internal channels 20 of respective pairs of tubular members 14a, 14b. The manifolds 36 may be formed separately from the tubular members 14, but preferably using the same or similar materials and/or methods, e.g., molding or extruding. The channels 38 may be pre-formed in the manifolds 36, e.g., during a molding process, or may be milled or otherwise formed subsequently into the manifolds 36.

The manifolds 36 may be attached to the respective ends of the tubular members 14, e.g., using a resin or other bonding material. Thus, the tubular members 14 may be formed into a unitary ply 30, with channels 38 communicating with respective pairs of internal channels 20. Alternatively, the channels 38 may be staggered (not shown) such that the internal spaces of the tubular members 14 are connected to one another in series along the width of the array, i.e., alternating between expanding and contracting tubular members 14. In a further alternative, the ply 30 may be integrally formed as a single piece.

A top plate 40, e.g., formed similar to the ply 30, may then be bonded or otherwise attached to the ply 30 to substantially seal the channels 38. The cover plate 40 may only be bonded along its outer perimeter to the ply 30 and/or around the edges of the channels 38. This may substantially minimize any impact that the cover plate 40 has on movement of the tubular members 14 when subjected to external forces. Alternatively, individual cover plates (not shown) may be bonded over each of the channels 38.

In addition, drain and/or fill holes may be provided that communicate with the channels 38, e.g., drilled through the cover plate 40 or through a wall of the ply 30. Fluid may then be introduced into the channels 38, and consequently into the internal spaces 20 within the tubular members 14, e.g., injected through the fill holes in a conventional manner (not shown). The drain and/or fill holes may then be sealed, e.g., with plugs (not shown) as is known in the art. Alternatively, the fluid may be introduced into the channels 38 before attaching the cover plate 40.

In alternative embodiments, instead of providing tubular members that extend substantially the full length of the composite material, a plurality of relatively short tubular members (not shown) may be arranged in the plane 24 and spaced apart along the longitudinal axis 34. Each tubular member may require a reservoir or may need to be connected to one or more complementary tubular members, e.g., by channels, as described above.

Once the assembled ply 30 and cover plate 40 are bonded together, matrix material 12 may be introduced around them to substantially encapsulate them therein using conventional processes, e.g., substantially filling any spaces between adjacent tubular members. In addition, other materials may be included before introducing the matrix material 12. For example, conventional composite elements, such as carbon, glass, or kevlar, e.g., in fibers or plies, and the like, may be provided in addition to the ply 30. Such elements may be arranged in a predetermined configuration to provide additional properties in the resulting composite material.

After the matrix material 12 has cured, the resulting composite sheet (not shown) may be bonded to additional similar sheets and/or formed into desired shapes to be incorporated into finished articles (not shown). Alternatively, thicker three-dimensional structures (not shown) may be formed using multiple rows of tubular members 14 spaced apart and stacked on top of one another (such as the exemplary two rows shown in FIG. 1), which are then infiltrated with matrix material 12 and/or cured together as a single structure.

Preferably, the plies 30 (or individual tubular members 14) are packed sufficiently densely within the matrix material 12 such that the composite material 10 substantially assumes the physical properties of the fluid-filled tubular members 14. In addition, the relative size of the tubular members 14 to the dimensions of the composite material 10, e.g., the width "w" and thickness "t," are such that the composite material 10 behaves as a substantially homogeneous material, although having unique properties.

For example, the tubular members 14 preferably have maximum cross-sectional dimensions, e.g., width and height, that are substantially smaller than the maximum dimensions of a finished article made from the material and/or a thickness t of the composite material 10. In a preferred form, the tubular members 14 have a maximum cross-sectional dimension that is less than about one centimeter (1 cm), preferably having a maximum cross-sectional dimension that is between about one hundred (100) microns and about one centimeter (1 cm), more preferably between about five hundred (500) microns and about five millimeters (5 mm), and most preferably about one millimeter (1 mm).

The tubular members 14 may constitute between about thirty percent and about seventy percent (30–70%) by volume of the composite material, and more preferably between about thirty and about fifty percent (30–50%). The percentage of tubular member content is generally defined by the desired final properties of the composite material. For example, increasing the tubular member content may increase the influence of the tubular member's behavior on the final properties of the composite material, while decreasing the tubular member content may dilute their influence, and emphasize the properties of the matrix material or other fibers therein, as will be appreciated by those skilled in the art.

The resulting composite material 10 exhibits unique physical properties that cannot be attained with traditional "natural" materials. The tubular members 14 have a cross-sectional shape that is deflected when the composite material 10 is subjected to certain forces. As the tubular members 14 are deflected, the shape of the composite material 10 may change, e.g., its thickness or width, and/or the structural properties of the material 10 may change. Thus, the tubular members 14 behave as a "machine" or, more particularly, as a "simple machine." "Machine," as used herein, refers to a structure that modifies the forces acting upon the overall material, for example, by diverting them in a different direction than the original forces and/or absorbing at least part of the forces acting upon the material. The "machine" may be at least partially semi-rigid and/or may include one or more deflectable portions, thereby allowing the overall material to respond in a predetermined manner when subjected to particular forces and/or stresses. Because of the preferred relatively small size of the machines described herein, they may also be referred to as "micromachines." Additional information on machines and their behavior within a composite material may be found in co-pending application Ser. No. 09/407,039, filed Sep. 28, 1999, the disclosure of which is expressly incorporated herein by reference.

Returning to FIG. 1, when the composite material 10 is subjected to shear forces, whose resulting stress changes the volume of the internal spaces 20 of the tubular members 14, fluid will flow into and/or out of respective tubular members 14. As the fluid moves, viscous forces act to impede the movement, and consequently dissipate energy. Thus, predetermined vibrational energy to which the composite material is exposed may be dissipated by the fluid flow. This dissipation of vibrational energy manifests itself as damping in the composite material 10. The materials of the matrix material 12, the tubular members 14, and/or the fluid 22 may be selected to provide desired damping characteristics with respect to target vibrations. In addition, the density and configuration of the tubular members 14 may also be selected to control damping characteristics of the composite material 10.

For example, the composite material 10 may be useful to control and minimize stresses induced by vibroacoustic forces, such as those often experienced by launch vehicles and spacecraft. High acoustic fields may be generated by such vehicles during launch, e.g., due to engine exhaust flow, aerodynamic forces on the vehicle skin, and the like. These forces may translate into structural dynamic responses, e.g., vibrations, that may be transmitted to items mounted to the skin and/or carried by structural connections to other locations within the vehicle. In addition, skin vibration may be radiated within the interior of the vehicle as acoustic energy. These vibrations may cause components within the vehicle to fatigue, e.g., causing electrical units to fail and/or wire bundles to short circuit.

Other lower frequency vibrations may also be treated, for example, those encountered in aircraft and/or automobiles. In addition, a composite damping material in accordance with the present invention may be used in buildings, bridges, and other structures, e.g., to enhance seismic isolation.

Thus, the tubular members or "machine" elements and resulting composite materials in accordance with the present invention may be applied to a variety of structures independent of scale, from relatively small micromachine structures to large macro-structures, such as buildings or bridges, by appropriately selecting the size and density of the machine elements proportional to the finished article.

Figure 5:
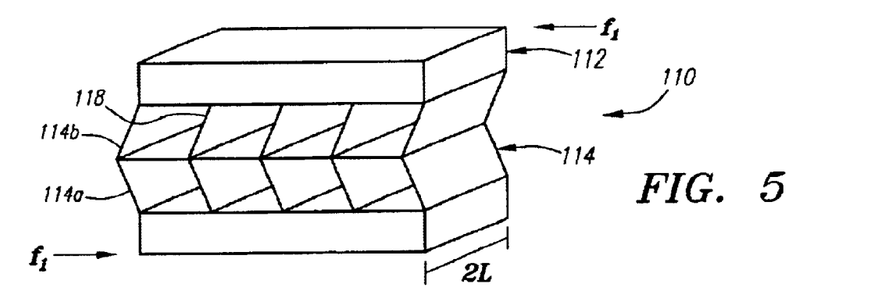
FIG. 5 is a perspective view of another preferred embodiment of a composite damping material, in accordance with the present invention.
Figure 7:
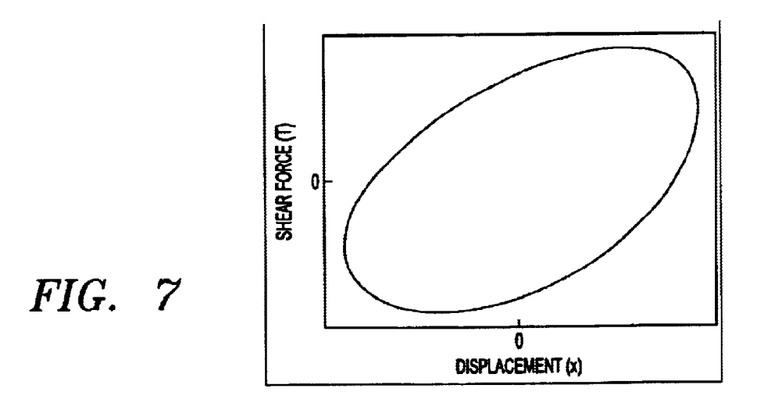
FIG. 7 is a graph of shear force versus displacement that illustrates performance of the composite material of FIG. 5.

Turning to FIG. 5, another embodiment of a composite material 110 is shown that uses tubular members 114 that are stacked on top of one another to provide a thicker ply of composite material before infiltration with matrix material 112 and/or curing. Adjacent tubular members 114 may share common walls 118 or, alternatively, connectors (not shown) may extend between tubular members 114 to maintain the array. Preferably, a lower layer of tubular members 114$a$ is oriented opposite to an upper layer of tubular members 114$b$. Thus, as the composite material 110 is sheared, e.g., by force $f_1$ the tubular members in the upper layer 114$b$ increase in volume, while the tubular members in the lower layer 114$a$ decrease in volume. Vertically adjacent tubular members 114$a$, 114$b$ may be connected by channels (not shown), similar to the previous embodiment, thereby providing a substantially closed system.

Figure 8:
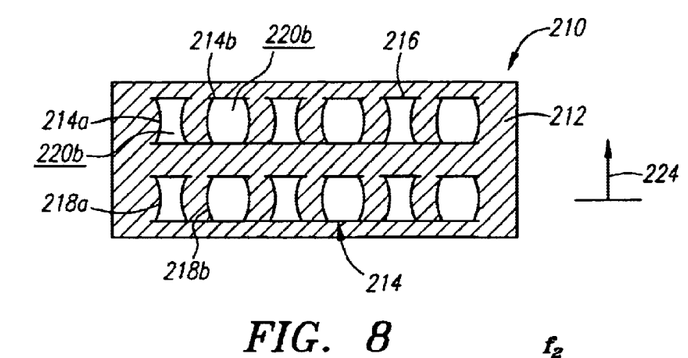
FIG. 8 is a cross-sectional view of yet another preferred embodiment of a composite damping material, in accordance with the present invention.
Figure 9:
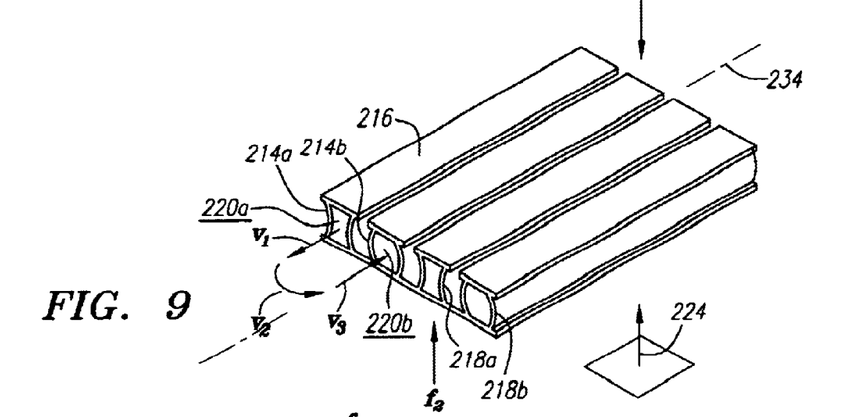
FIG. 9 is a perspective view of a ply of elongate tubular elements that may incorporated in the composite damping material of FIG. 8.
Figure 10:
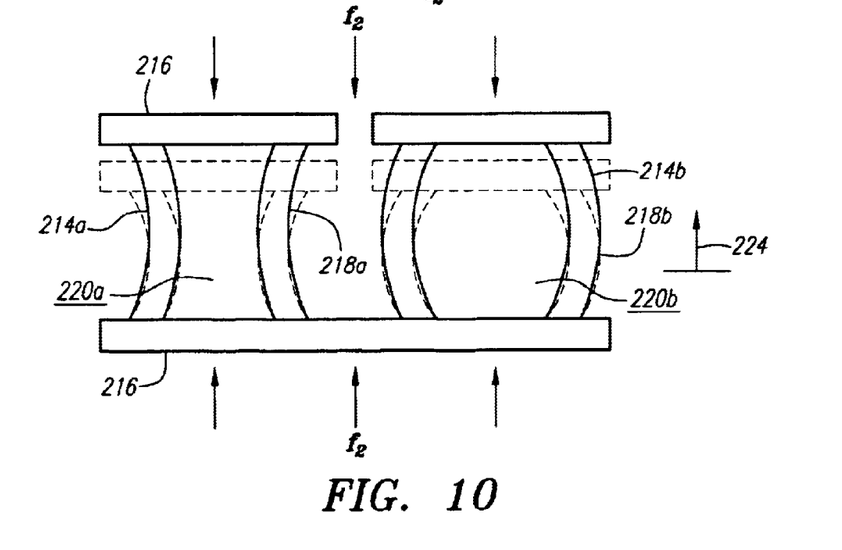
FIG. 10 is a detail of an end view of a cooperating pair of the tubular elements of FIG. 9, showing displacement of the tubular elements when acted upon by a transverse force in phantom.

Turning to FIGS. 8–10, a cross-section of another preferred embodiment of a composite material 210 is shown that includes a plurality of elongate tubular members 214 disposed within matrix material 212, similar to the previous embodiments. As best seen in FIG. 10, the tubular members 214 are preferably provided in complementary pairs. Each tubular member 214 includes a pair of opposing planar walls 216 connected by transverse walls 218, which are semi-rigid or flexible, and have a curved shape. One tubular member 214$a$ defines a generally hourglass-shaped internal space 220$a$, while the other tubular member 214$b$ a generally apple-shaped internal space 220$b$.

When the planar walls 216 are subjected to compressive forces, such as $f_2$, the transverse walls 218$a$ may bend and bow inwards into the cavity 220$a$ and the transverse walls 218$b$ may bend and bow outward away from the cavity 220$b$. This may cause the respective internal spaces 220$a$, 220$b$ to compress and expand, respectively, thereby forcing fluid out of and into the respective internal spaces 220$a$, 220$b$. The internal spaces 220$a$, 220$b$ may be connected by channels, similar to the embodiments described above, to provide a substantially closed system. The composite material 210 may then be used to dampen vibrational energy, similar to the embodiments described above, but caused by transverse compressive or tensile forces.

Figure 11:
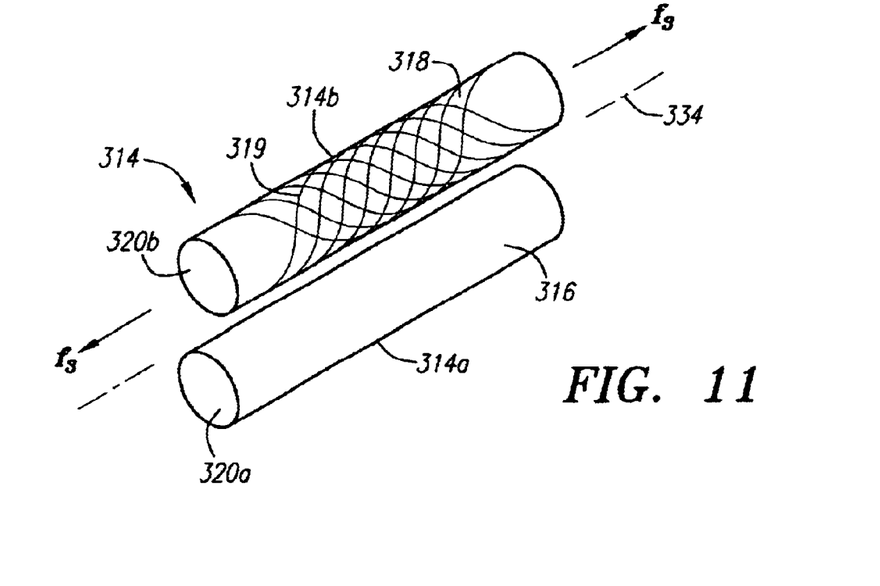
FIG. 11 is a perspective view of yet another preferred embodiment of a pair of tubular elements that may be incorporated into a composite damping material, in accordance with the present invention.

Turning to FIG. 11, yet another embodiment of a complementary pair of tubular members 314 are shown that may be encapsulated within a matrix material (not shown). Internal spaces 320 within the tubular members 314 may be filled with a viscous fluid, similar to the embodiments described above. A plurality of such fluid-filled tubular members 314 may be disposed in a desired substantially parallel array to provide a composite material capable of damping tensile/compressive forces, such as force "$f_3$," directed substantially parallel to longitudinal axis 334. The first tubular member 314$a$ has a substantially rigid wall 316, thereby providing a substantially constant cross-section or diameter. Thus, when a tensile force, $f_3$, is applied to the first tubular member 314$a$, the internal volume 320$a$ may be increased, because the first tubular member 314$a$ may stretch in length, while its diameter remains substantially constant.

In contrast, the second tubular member 314$b$ includes an elongate flexible, nonporous tube 318 that is contained within a helical mesh structure 319. The mesh structure 319 is preferably formed from a resilient elastic material, such as a urethane skin covered by carbon fibers. The tube 318 is preferably formed from urethane that is bonded to the interior of the mesh structure 319 or otherwise free sliding therein. Alternatively, the mesh structure 319 may be formed within the skin of the tube or in the interior of the tube (not shown). As the mesh structure 319 is subjected to a tensile force, $f_3$, the mesh structure 319 may constrict in diameter, but resiliently return to its original shape when the force is removed. The mesh structure 319 is bonded to the tube 318, e.g., to an outer surface thereof, such that constriction of the mesh structure 319 under tension decreases the volume of the internal space 320$b$ of the tube 318.

The internal spaces 320$a$, 320$b$ of the tubular members may be connected to one another by channels or may include bubbles (not shown), as described above, thereby providing a substantially closed system. For example, under tension, the second tubular member 314$b$ may decrease in volume, thereby forcing fluid out of the internal space 320$b$. Simultaneously, the first tubular member 314$a$ may increase in volume, thereby pulling fluid into the internal space 320$a$. Under axially compressive loads, the volume of the internal space 320$a$ of the first tubular member 314$a$ may decrease, thereby forcing fluid out of the internal space 320$a$. Consequently, fluid may flow into the second tubular member 314$b$, thereby causing the tube 318 to increase in diameter as it fills with additional fluid.

As will be appreciated by those skilled in the art, any number of tubular members or "machine" elements may be provided within a composite material in accordance with the present invention. In addition, a composite material in accordance with the present invention may include more than one type of machine within the matrix material. For example, the composite material may include multiple layers of machines, each configured to dampen different types of forces, e.g., shear forces, tensile/compressive forces, and/or transverse forces. Further, the composite material may include other elements, such as conventional fibers or pre-pregs, microbubbles, and the like. In addition, other fluid-filled machine elements or three dimensional bodies may be encapsulated within the matrix material to provide additional material or damping characteristics in addition to the specific exemplary embodiments described herein.

While embodiments of the present invention have been shown and described, various modifications may be made without departing from the scope of the present invention, and all such modifications and equivalents are intended to be covered.

What is claimed is:

1. A composite material, comprising:
   a matrix material;
   a first tubular member, having a first internal space defining a volume within the matrix material, that deflects and decreases the volume of the first internal space in response to the application of a force to the composite material;
   a volume of fluid within the first internal space; and
   a second tubular member, having a second internal space defining a volume within the matrix material and in fluid communication with the first internal space, that deflects and increases the volume of the second internal space in response to the application of the force to the composite material independent of any transfer of fluid from the first internal space;
   wherein the first and second tubular members are formed from respective materials that are harder than the matrix material.

2. A composite material as claimed in claim 1, wherein the first and second tubular members each define a respective longitudinal axis and a perimeter extending about the longitudinal axis and are embedded within the matrix material such that substantially the entire perimeters of the tubular members are in contact with the matrix material.

3. A composite material as claimed in claim 1, wherein the matrix material is substantially nonporous.

4. A composite material as claimed in claim 1, wherein the first tubular member includes upper and lower substantially planar walls that are substantially parallel to one another and that remain substantially parallel to one another as the first tubular member deflects and the second tubular member includes upper and lower substantially planar walls that are substantially parallel to one another and that remain substantially parallel to one another as the second tubular member deflects.

5. A composite material as claimed in claim 4, wherein the first tubular member includes a pair of substantially planar side walls which extend from the upper substantially planar wall to the lower substantially planar wall and pivot together as the first tubular member deflects and the second tubular member includes a pair of substantially planar side walls which extend from the upper substantially planar wall to the lower substantially planar wall and pivot together as the second tubular member deflects.

6. A composite material as claimed in claim 4, wherein the first tubular member includes a pair of curved side walls which extend from the upper substantially planar wall to the lower substantially planar wall and the second tubular member includes a pair of curved side walls which extend from the upper substantially planar wall to the lower substantially planar wall.

7. A composite material as claimed in claim 6, wherein curved side walls of the first tubular member are convex and the curved side walls of the second tubular member are concave.

8. A composite material as claimed in claim 4, wherein the upper walls of the first and second tubular members move in the same direction when the first and second tubular members deflect.

9. A composite material as claimed in claim 1, wherein the first and second tubular members comprise first and second cylindrical members defining respective lengths and diameters.

10. A composite material as claimed in claim 9, wherein the deflection of the first tubular member comprises a reduction in diameter and the deflection of the second tubular member comprises an increase in length while the diameter remains substantially constant.

11. A composite material as claimed in claim 1, wherein the fluid comprises a volume of substantially incompressible fluid.

12. A composite material as claimed in claim 1, wherein the fluid comprises a liquid.

13. A composite material as claimed in claim 1, wherein internal spaces of the first and second tubular members together define a substantially closed internal space.

14. A composite material, comprising:
    a matrix material;
    a tubular member within the matrix material including upper and lower walls and first and second concave side walls that extend from the upper wall to the lower wall, the upper and lower walls and first and second concave side walls together defining an internal space having a volume that decreases in response to the application of a compressive force to the composite material;
    a volume of substantially incompressible fluid within the internal space; and
    a volume of substantially compressible fluid within the internal space.

15. A composite material as claimed in claim 14, wherein the tubular member defines a longitudinal axis and a perimeter extending about the longitudinal axis and is embedded within the matrix material the such that substantially the entire perimeter of the tubular member is in contact with the matrix material.

16. A composite material as claimed in claim 14, wherein the upper and lower walls are substantially parallel to one another.

17. A composite material as claimed in claim 14, wherein the tubular member is formed from material that is harder than the matrix material.

18. A composite material as claimed in claim 14, wherein the tubular member comprises a plurality of tubular members including a volume of substantially incompressible fluid and a volume of substantially compressible fluid within their respective internal spaces.

19. A composite material, comprising:
    a matrix material;
    a tubular member within the matrix material, and formed from material that is harder than the matrix material, including upper and lower walls and first and second side walls that extend from the upper wall to the lower wall, the first and second side walls being substantially parallel to one another and defining non-perpendicular angles with the upper and lower walls, the upper and lower walls and first and second side walls together defining an internal space having a volume that decreases in response to the application of a shear force to the composite material;
    a volume of substantially incompressible fluid within the internal space; and
    a volume of substantially compressible fluid within the internal space.

20. A composite material as claimed in claim 19, wherein the tubular member defines a longitudinal axis and a perimeter extending about the longitudinal axis and is embedded within the matrix material such that substantially the entire perimeter of the tubular member is in contact with the matrix material.

21. A composite material as claimed in claim 19, wherein the upper and lower walls are substantially parallel to one another.

22. A composite material as claimed in claim 19, wherein the tubular member comprises a plurality of tubular members including a volume of substantially incompressible fluid and a volume of substantially compressible fluid within their respective internal spaces.

23. A composite material as claimed in claim 19, wherein at least a portion of the internal space is a sealed internal space and the volume of substantially incompressible fluid and the volume of substantially compressible fluid is within the sealed internal space.

24. A composite material as claimed in claim 19, wherein the length, width and thickness of the matrix material is substantially constant.

25. A composite material, comprising:

a matrix material;

a first tubular member, having a first internal space defining a volume within the matrix material, that deflects and decreases the volume of the first internal space in response to the application of a force to the composite material;

a volume of fluid within the first internal space; and a second tubular member, having a second internal space defining a volume within the matrix material and in fluid communication with the first internal space, that deflects and increases the volume of the second internal space in response to the application of the force to the composite material independent of any transfer of fluid from the first internal space;

wherein the matrix material defines a modulus of elasticity and the first and second tubular member are formed from material defining respective moduli of elasticity that are greater than the matrix material modulus of elasticity.

26. A composite material, comprising:

a matrix material;

a tubular member, including a mesh structure and a flexible nonporous tube within the mesh structure, within the matrix material defining an internal space having a volume that decreases in response to the application of a tensile force to the composite material;

a volume of substantially incompressible fluid within the internal space; and a volume of substantially compressible fluid within the internal space.

\* \* \* \* \*